United States Patent

Koyanagi et al.

[15] 3,639,270
[45] Feb. 1, 1972

[54] CATALYST COMPOSITION FOR OXYCHLORINATING HYDROCARBONS AND PROCESS FOR PREPARING THE CATALYST COMPOSITION

[72] Inventors: Shunichi Koyanagi; Kinya Ogawa; Fumio Akiya, all of Niigata-ken, Japan

[73] Assignee: Shin Etsu Chemical Co., Ltd., Tokyo, Japan

[22] Filed: May 21, 1968

[21] Appl. No.: 730,926

[30] Foreign Application Priority Data

May 23, 1967 Japan....................................42/32744

[52] U.S. Cl.............................252/441, 252/442, 260/659
[51] Int. Cl. .........................................................B01j 11/78
[58] Field of Search...........................252/441, 442; 260/659

[56] References Cited

UNITED STATES PATENTS

| | | | |
|---|---|---|---|
| 2,206,399 | 7/1940 | Grosvenor | 23/219 |
| 2,442,285 | 5/1948 | Cheney | 260/652 |
| 3,206,517 | 9/1965 | Fenton | 260/656 |
| 3,214,481 | 10/1965 | Heinemann | 252/441 X |
| 3,461,084 | 8/1969 | Li | 252/441 |

*Primary Examiner*—Daniel E. Wyman
*Assistant Examiner*—Philip M. French
*Attorney*—McGlew and Toren

[57] ABSTRACT

Catalyst composition suitable for the oxychlorination of hydrocarbons. The catalyst composition has superior thermal stability, a long-lasting catalytic activity and essentially consists of cupric chloride and a tantalum fluoride salt which are deposited on a porous carrier.

3 Claims, No Drawings

CATALYST COMPOSITION FOR OXYCHLORINATING HYDROCARBONS AND PROCESS FOR PREPARING THE CATALYST COMPOSITION

The application also discloses a method of preparing the novel catalyst composition by depositing cupric chloride and tantalum fluoride salt on a porous carrier.

The invention is also concerned with a process for oxychlorinating aliphatic hydrocarbons by passing the hydrocarbons in conjunction with an oxygen-containing gas and hydrogen chloride over the novel catalyst composition. If the hydrocarbon to be chlorinated is of olefinic nature, the reaction temperature should be 150°–280° C. In respect to paraffinic hydrocarbon, the reaction temperature is preferably 250°–450° C.

SUMMARY OF THE INVENTION

This invention generally relates to catalysts and is particularly directed to a novel catalyst composition suitable for the oxychlorination of aliphatic hydrocarbons, and to a method for preparing such catalyst composition. Considered from another aspect, the invention relates to a process for the oxychlorination of aliphatic hydrocarbons with the novel catalyst composition for the purpose of obtaining chlorinated aliphatic hydrocarbons.

It has previously been suggested to effect oxychlorination of hydrocarbons in the presence of catalysts that contain cupric chloride as the main constituent. A cupric chloride containing catalyst of this nature has thus been disclosed in U.S. Pat. No. 3,148,515. These known cupric chloride-containing catalysts are, however, not entirely satisfactory because they have the tendency of gradually losing their catalytic activity. The reason for this is that due to the high temperatures which are employed during the oxychlorination reaction, the cupric chloride is slowly volatilized which, in turn, results in reduced catalyst activity. With a view to minimizing this phenomenon, it has been suggested to use the cupric chloride in conjunction with chlorides of alkali metals, selenium, ytterbium, thorium, uranium and didyium or bisulfates such as $NaHSO_4$. These attempts, however, have not been successful because, even if such catalyst mixtures are used, the reaction temperature during the oxychlorination reaction must still be kept as high as between 200° and 300° C. which, in turn, results in the occurrence of undesired side reactions which reduce the yield rates of the chlorinated hydrocarbons, to wit, the desired end products. Generally, the use of such known catalyst mixtures and the side reactions resulting from such use, render the refining processes exceedingly complicated. Furthermore, the tendency of the cupric chloride to volatilize is not negated by the admixture of the additional ingredients and the gaseous cupric chloride, in combination with hydrogen chloride and water, cause significant corrosion of the reaction apparatus.

U.S. Pat. No. 3,010,913 suggests that the HCl conversion may be increased to above 90 percent at relatively low temperature of between 180° and 250° C.; by employing catalysts which are prepared by depositing cupric chloride, dissolved in an alkyl alcohol containing from one to eight carbon atoms, on porous carriers, the cupric chloride being the main constituent of the catalyst. Oxychlorination with such catalysts does not result in high yields of chlorinated hydrocarbons and requires complicated refining processes. This prior art procedure is therefore not economically sound.

It is a primary object of the present invention to overcome the prior art disadvantages and drawbacks by providing a cupric chloride-containing catalyst suitable for the oxychlorination of aliphatic hydrocarbons which is possessed of superior thermal stability and which maintains its catalytic activity over long periods of time.

It is also an object of this invention to provide a novel catalyst composition of the indicated nature which renders it possible to obtain chlorinated aliphatic hydrocarbons in high yields and at relatively low reaction temperatures.

A further object of the invention is to provide a novel catalyst composition of the indicated nature which makes it possible to oxychlorinate aliphatic hydrocarbons at low temperatures and in high yields and without the occurrence of undesired side reactions.

Still another object of the invention is to provide an exceedingly simple process for preparing the novel catalyst compositions.

Considered from another aspect, it is an object of the invention to provide a simple process for preparing chlorinated aliphatic hydrocarbons with the use of the novel catalyst compositions without requiring complicated refining procedures.

Still another object of the invention is to provide a process for oxychlorinating aliphatic hydrocarbons which may be carried out without danger of corrosion of the reaction apparatus.

Briefly, and in accordance with this invention, the novel catalyst composition essentially consists of a porous carrier having incorporated therein cupric chloride and at least one tantalum fluoride salt. The catalyst composition is prepared by depositing a mixture of the cupric chloride and the tantalum fluoride salt on the porous carrier.

Oxychlorination of aliphatic hydrocarbons with the novel catalyst composition is carried out in accordance with the invention in the vapor phase and in the presence of an oxygen containing gas and hydrogen chloride.

It is well known in the art that cupric chloride catalysts employed in oxychlorination reactions exhibit their greatest activity when they are in a molten state. Since the melting points of prior art cupric chloride catalyst are relatively high, the catalysts had to be maintained at a high temperature with a view to enhancing their catalytic efficiency. By contrast, and in accordance with this invention, it has been found that mixtures of cupric chloride and tantalum fluoride salts have a comparatively low melting point while at the same time exhibiting an extremely high catalytic activity. Accordingly, the novel catalyst composition comprising cupric chloride and a tantalum fluoride salt can be successfully employed for the catalytic oxychlorination of aliphatic hydrocarbons at relatively low temperatures thereby avoiding the dreaded volatilization of cupric chloride. While the melting point of cupric chloride is 498° C., that of tantalum fluoride is but 96.8° C., so that a mixture of the two salts forms a compound having a low eutectic point which, by properly choosing the mixing ratio of the two salts, can be fixed to a value below 120°–130° C.

As previously stated, the mixture of cupric chloride and tantalum fluoride salt is deposited on a porous carrier. The term "porous carrier" is deemed to mean any suitable well-known porous substance, as, for example, activated alumina, active charcoal, silica gel, brick, pumice and diatomaceous earth, which thus serves as carrier during the oxychlorination reaction.

The mixing ratio of the components cupric chloride and tantalum fluoride salt should be about between 1:20 and 50:1 by molar ratio in order to give the optimum effect during the oxychlorination reaction. The preferred ratio is between about 1:1 and 5:1 by molar ratio. The concentration of the mixture deposited on the porous carrier is also of importance and should be from 1 to 40 weight percent cupric chloride calculated on 100 weight percent of the porous carrier. Nonadherence to the ratios given above does not result in sufficiently economical reaction rates. For example, if the concentration of cupric chloride in the mixture is below 1 percent by weight, the reaction rate will be too low so as to yield any satisfactory industrial advantage. By contrast, if the cupric chloride amount is above 40 percent by weight, the surface area of the porous carrier will become too small, which in turn results in a reduction of the catalytic activity.

From a technical point of view, the mixture of $CuCl_2$ and $TaF_5$ is advantageously deposited on the porous carrier by dissolving the two salts in water and dipping the porous carrier into the aqueous solution. The porous carrier is then removed from the solution and subjected to drying. The solution may also be sprayed or poured on the carrier material. If necessary, heating of the carrier may be effected to accelerate the drying.

The solvent for the two salts need not, however, be water since organic solvents such as alcohol, for example, ethyl alcohol, may be used. In some instances, it may be advantageous to blend the porous carrier with a powdered mixture of the two salts, to wit, the cupric chloride and the tantalum fluoride, and slightly to compress the resulting mass into a self-supporting body. The catalyst composition exhibits high catalyst activity and extreme stability. Its thermal characteristics are excellent.

As previously stated, one of the components of the catalyst composition is a tantalum fluoride salt. Tantalum fluoride proper yields excellent results and may therefore primarily be used, but other tantalum fluoride salts may also be employed. Thus tantalum fluoride containing complex salts such as tantalum potassium fluoride and tantalum sodium fluoride may advantageously be used for the inventive purposes. Mixtures of different tantalum fluoride salts are also suitable. Thus, for example, a mixture of tantalum fluoride proper and tantalum potassium fluoride and/or tantalum sodium fluoride gives excellent results.

In the oxychlorination of aliphatic hydrocarbons, the aliphatic hydrocarbons, hydrogen chloride and oxygen or an oxygen-containing gas, such as air, are passed in mixture over the catalyst composition of this invention. If the hydrocarbons are of olefinic nature, the reaction temperature during the oxychlorination should be in the range of from 150°–280° C. A preferred reaction temperature range is from 150°–200° C. If the temperature is below 150° C., the reaction rate will be too low to be economically sound. By contrast, if the temperature is relatively high, to wit, above 280° C., side reactions are liable to take place. For example, in the oxychlorination of ethylene, byproducts such as methyl chloride, cis- and trans-1,2-dichloroethylene, 1,1,2-trichloroethane, 1,1,2,2-tetrachloroethane and trichloroethylene may be produced, lowering the selectivity of 1,2-dichloroethane which is the desired end product.

A suitable mixing ratio for the gases, to wit, olefinic hydrocarbon, hydrogen chloride and oxygen, to be passed over the catalyst composition is about 1:0.5–3 : 0.1–1 by volume, while the contact time should preferably be from 0.1 to 30 seconds. The reaction may be carried out under any suitable pressure conditions.

The catalysts of the invention may also advantageously be employed in the oxychlorination of paraffinic hydrocarbons. In this event, the reaction temperature should be in the range of from 250°–450° C. In respect to the mixing ratio of the gases which are passed over the catalyst, the ratio of hydrogen chloride to hydrocarbons may be either increased or decreased in accordance with the kind of chloride which is desired as the end product. However, it is preferred that the volume of oxygen should be larger than that of hydrogen chloride.

Whether the hydrocarbons employed as a starting material are of olefinic or of paraffinic nature, the catalyst will have the greatest effect if the hydrocarbons contain less than four carbon atoms per molecule.

The invention will now be described by several examples, it being understood that these examples are given by way of illustration and not by way of limitation and that many changes may be effected without affecting the scope and spirit of this invention as recited in the appended claims.

In the examples, the term "HCl conversion" means the rate of hydrogen chloride consumed to hydrogen chloride supplied and "EDC selectivity" means the mole percent of 1,2-dichloroethane to chlorinated hydrocarbons prepared by the reaction.

EXAMPLES 1–5

Five different catalysts, to wit, 1, 2, 3, 4 and 5, were prepared. The preparation of each catalyst was effected by depositing the respective catalytic composition indicated in table 1 on 100 g. of activated alumina. The depositing was effected by pouring an aqueous solution of the catalyst salts on the activated alumina and subsequent drying. Each of the catalysts thus prepared was put in a reaction tube and maintained at 180° C. A mixture of ethylene, hydrogen chloride and air was passed over the catalyst in the ratio indicated in the table at the space velocity of 495 N l/l. cat.hr. to effect the oxychlorination reaction. For control purposes, the same reaction was carried out by employing catalysts which consisted of $CuCl_2$, $CuCl_2$-KCl and $CuCl_2$-$NaHSO_4$-$NH_4HSO_4$. The results are tabulated in the following table 1.

TABLE 1

| Compositions of catalysts | Example | | | | | Control | | |
|---|---|---|---|---|---|---|---|---|
| | 1 | 2 | 3 | 4 | 5 | 1 | 2 | 3 |
| $CuCl_2$ (mole) | 0.1 | 0.1 | 0.1 | 0.1 | 0.2 | 0.1 | 0.1 | 0.1 |
| $TaF_5$ (mole) | 0.05 | | 0.025 | 0.01 | 0.10 | | | |
| $K_2TaF_7$ (mole) | | | 0.05 | 0.025 | | | | |
| KCl (mole) | | | | | | | 0.1 | |
| $NaHSO_4$ (mole) | | | | | | | | 0.05 |
| $NH_4HSO_4$ (mole) | | | | | | | | 0.05 |
| Activated alumina (g.) | 100 | 100 | 100 | 100 | 100 | 100 | 100 | 100 |
| Reaction temperature (° C.) | 180 | 180 | 180 | 180 | 180 | 180 | 180 | 180 |
| $HCl/C_2H_4$ (volume ratio) | 2 | 2 | 2 | 2 | 2 | 2 | 2 | 2 |
| $Air/C_2H_4$ (volume ratio) | 5 | 5 | 5 | 5 | 5 | 5 | 5 | 5 |
| HCl conversions (percent) | 73.39 | 68.27 | 70.00 | 40.00 | 75.30 | 3.21 | 11.30 | 32.00 |
| EDC selectivities (mole percent) | 99.20 | 99.10 | 99.10 | 99.21 | 99.05 | 98.70 | 95.10 | 98.90 |

EXAMPLE 6

The same reaction as described in examples 1–5 was carried out at the temperatures listed in table 2. The reactions were effective for 50 hours, consecutively. The results obtained indicated the activity change rates as tabulated in table 2, demonstrating the excellent thermal stability of the inventive catalyst composition.

$$\text{Catalyst activity change rate} = \left(1 - \frac{\text{HCl conversion after 50 hours}}{\text{HCl conversion at the start}}\right) \times 100$$

TABLE 2

| | Catalyst of Example 1 | | | Catalyst of Control 1 | | |
|---|---|---|---|---|---|---|
| Reaction temperature (° C.) | 180 | 230 | 260 | 180 | 230 | 260 |
| Activity change rate (percent) | 0 | 0.01 | 0.1 | 0.01 | 1.30 | 20.5 |

EXAMPLE 7

The catalyst identified in example 1 was placed in a reaction tube. A mixture of reaction gases consisting of propylene, hydrogen chloride and air in the volume ratio of 1.25:1:2.5 was passed over the catalyst at a space velocity of 505 N l/l. cat.hr. The reaction was carried out at a temperature of 180° C. The HCl conversion was 82 percent, and the reaction product, upon analysis, proved to consist of chlorides of the following composition.

| | |
|---|---|
| n-propyl chloride | 17.9 weight % |
| 1,2-dichloropropane | 45.2 weight % |
| 1,3-dichloropropane | 34.8 weight % |
| allyl chloride | 2.1 weight % |

EXAMPLE 8

The catalyst of example 1 was placed in a reaction tube. A mixture of reaction gases consisting of methane, hydrogen chloride and air in the volume ratio of 1:2:5.5 was passed over the catalyst at a space velocity of 425 N l/l. cat.hr. The reaction was carried out at a temperature of 400° C. The HCl conversion was 90 percent and the chloromethanes obtained proved to be of the following composition.

| | |
|---|---|
| monochloromethane | 14.0 weight % |
| dichloromethane | 39.2 weight % |
| trichloromethane | 32.0 weight % |
| tetrachloromethane | 14.8 weight % |

EXAMPLE 9

The catalyst of example 1 was placed in a reaction tube. A mixture of reaction gases consisting of ethane, hydrogen chloride and air in the volume ratio of 1:2:5.5 was passed over the catalyst at a space velocity of 625 N l/l. cat. hr. The reaction was carried out at a temperature of 300° C. The HCl conversion was 64 percent and the chlorides obtained had the following composition.

| | |
|---|---|
| vinyl chloride | 4.2 weight % |
| monochloroethane | 23.2 weight % |
| vinylidene chloride | 13.2 weight % |
| 1,1-dichloroethane | 30.0 weight % |
| 1,2-dichloroethane | 24.0 weight % |
| 1,1,1-trichloroethane | 3.4 weight % |
| 1,1,2-trichloroethane | 2.0 weight % |

While specific embodiments of the invention have been shown and described in detail to illustrate the application of the inventive principles, it will be understood that the invention may be embodied otherwise without departing from such principles.

What is claimed is:

1. A catalyst suitable for the oxychlorination of aliphatic hydrocarbons, said catalyst essentially consisting of a porous carrier having incorporated therein a mixture of cupric chloride and at least one tantalum salt selected from the group consisting of tantalum fluoride, tantalum potassium fluoride and tantalum sodium fluoride, the molar ratio of said cupric chloride to said tantalum salt being between about 1:20 and 50:1, said cupric chloride being present in said porous carrier in a concentration of about 1 percent to 40 percent by weight calculated on said carrier.

2. A catalyst as claimed in claim 1, wherein said porous carrier is activated alumina, active charcoal, silica gel, brick, pumice or diatomaceous earth.

3. A catalyst as claimed in claim 1, wherein the molar ratio of cupric chloride to tantalum salt is between 1:1 and 5:1.

* * * * *